Dec. 26, 1967    V. M. HALSALL    3,360,403
BATTERY INCLUDING IMPROVED VENTING SYSTEM
Filed May 4, 1965
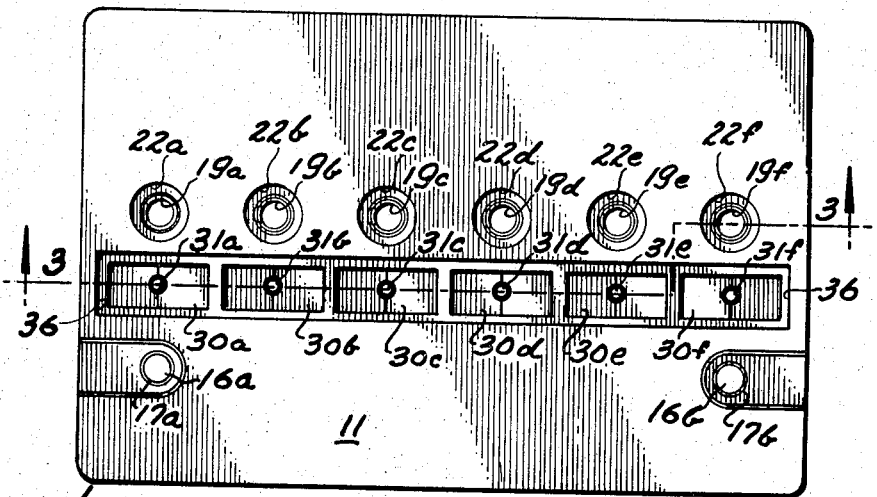
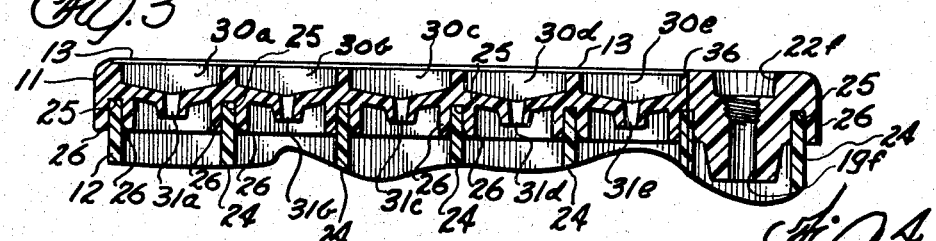
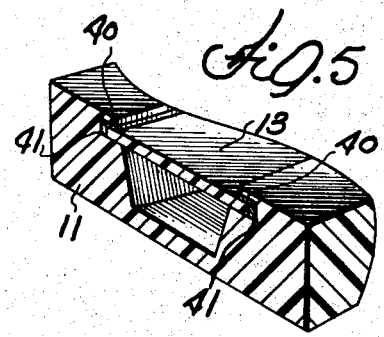
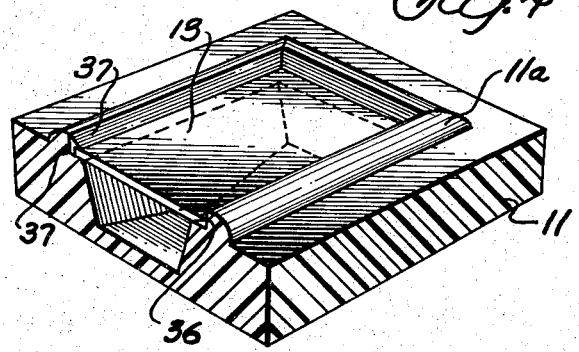
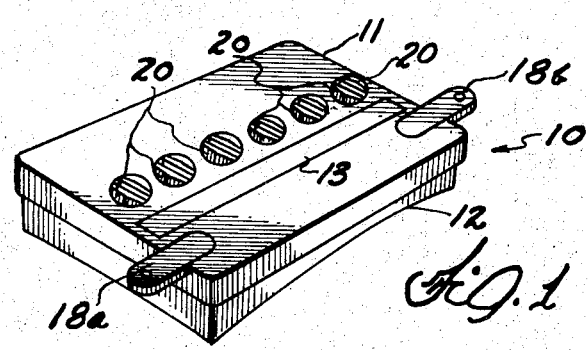
Inventor
Vincent Micheal Halsall
By~ Pendleton, Neuman
Seibold & Williams
Attorneys United States Patent Office 3,360,403
Patented Dec. 26, 1967

3,360,403
BATTERY INCLUDING IMPROVED
VENTING SYSTEM
Vincent Michael Halsall, Bayside, Wis., assignor to Globe-Union Inc., Milwaukee, Wis., a corporation of Delaware
Filed May 4, 1965, Ser. No. 453,014
4 Claims. (Cl. 136—170)

ABSTRACT OF THE DISCLOSURE

A venting system for a storage battery including separate vents and filling ports for each cell. All the vents are covered with a single microporous plastic sheet to allow for passage of the gases while preventing escape of the battery liquids.

The present invention relates to casings for storage batteries and more specifically to an improved venting system for such batteries. While not so limited in its uses, the present invention finds particularly advantageous utilization in connection with batteries adapted for use on motorcycles and other automotive application wherein it is desirable to prevent contamination of the area wherein the battery is situated by corrosive fumes from the battery.

One problem sometimes encountered in motorcycle applications concerns the venting of gases generated in the cells of the motorcycle battery to the atmosphere. While in an ordinary automotive battery, the caps which close the filling apertures of the battery are normally provided with small vent holes or vent passageways for venting these gases to the immediate vicinity of the battery, this is not satisfactory for motorcycle applications. A motorcycle battery is commonly located in the proximity of the legs of the cyclist or near the chrome finish of the motorcycle, and it is therefore desirable that corrosive fumes or liquids not be discharged in the area of the cyclist's body or clothing or in the area of various parts of the motorcycle which may be damaged thereby.

A similar problem is encountered in some automotive applications. For example, some automobile manufacturers are experimenting with the idea of locating automobile batteries in the trunk. In such applications, fumes or liquids vented from ordinary batteries may contaminate the interior of the car and adversely affect its occupants. Consequently, it is desirable to prevent the discharge of any corrosive fumes or liquid into the trunk. Additionally, in rear engine automobiles, the engine chamber is not ventilated to the same extent as the engine chamber of front engine automobiles. Consequently, it is likewise desirable to prevent the discharge of corrosive fumes or liquid in such engine chambers so as to prevent possible corrosive actions and possible accumulations of dangerous gases.

Several ways of overcoming the aforementioned problems have been known in the prior art, which include venting the batteries to a remote location. These constructions are relatively complicated and expensive, however, and it is desirable to provide ways in which the cost and complexity of such batteries may be reduced.

Accordingly, it is a principal object of the present invention to provide a new and improved battery which is adapted to prevent the discharge of corrosive fumes or liquids into the battery area without requiring that the battery be vented to a remote location. More specifically, it is an object to provide a battery having new and improved venting means which allow for the passage of gases therethrough and inhibit the passage of liquid therethrough. Another more specific object is to provide such a battery which prevents carry-over of electrolyte between the battery cells. A related object is to provide such venting means which minimizes loss of electrolyte from the battery cells and prevents contamination of the electrolyte.

Another object of the present invention is to provide such a battery in which the venting means is disposed within the cover of the battery casing. In this connection, it is an object to provide a battery construction having an integrally molded battery cover including a vent chamber for each of the cells of the battery formed in the outer surface of the cover and a venting diaphragm closing all of the vent chambers and functioning to individually vent the battery cells. A further object is to provide such a battery construction wherein the diaphragm is formed of a microporous thermoplastic material.

An additional object is to provide a new and improved battery construction which renders the battery explosion-proof.

A general object of the present invention is to provide improved venting means for a storage battery which results in simplified manufacture, a more aesthetic appearance, and enhanced operation. Another general object is to provide a new and improved battery characterized in its relative simplicity and inexpensiveness.

In a preferred form of the invention, a battery is provided with an integrally molded cover member having a vent chamber for each of the cells of the battery, each vent chamber having a port communicating with the associated cell. The chambers of the cover member open outwardly and are all closed by a single, relatively thin, cover sheet of microporous material, such as plastic, overlying at least a portion of the cover member. The cover sheet functions to independently vent the battery cells and to prevent the egress of electrolytic liquid from the battery. Preferably, the cover sheet is disposed within a recess in the cover and is suitably sealed thereto to prevent acid creep between the cover and the material. Additionally, the cover member may be provided with recessed filler ports adapted to receive filler caps so that a flush cover is provided even after the filler caps have been inserted in the filler ports.

This construction provides a cover which is relatively inexpensive and easy to manufacture, being comprised of only two component parts as far as the venting mechanism is concerned, namely, the cover member and the cover sheet.

Further objects and advantages of the present invention will become manifest upon reading the attached detailed description taken in conjunction with the drawing, wherein:

FIGURE 1 is a fragmentary perspective view of a storage battery embodying the present invention;

FIG. 2 is a top plan view of the battery in FIG. 1 with its cover sheet removed;

FIG. 3 is a vertical cross-sectional view, partially broken away, taken along the line 3—3 of FIG. 2, but with the cover sheet in place;

FIG. 4 is an enlarged perspective view of a portion of the storage battery showing an exemplary cover sheet sealing arrangement; and FIG. 5 is an enlarged perspective view of a portion of a storage battery showing an alternative cover sheet sealing arrangement.

While the invention has been shown and will be described in some detail with reference to a particular, exemplary embodiment thereof, there is no intention to limit the invention to such detail. Quite to the contrary, it is intended here to embrace all modifications, alternatives and equivalents falling within the spirit and scope of the invention as defined by the appended claims. For the purpose of the ensuing description, it will be assumed the invention is incorporated in a battery for a motorcycle having undercover intercell connections. However, it will be readily apparent that the invention may likewise be incorporated in a battery utilized in any automotive application and in a battery having overcover intercell connections.

Referring now to the drawing, a storage battery 10 is illustrated which incorporates the features of the present invention. A cover member 11, of the type now generally known as a one-piece cover, is secured to a battery casing body 12, the cover member being disclosed in general rectangular form. As may be seen, the cover member 11 is recessed at two locations to receive terminal leads 18a and 18b which extend outwardly from the battery. The terminal leads 18a and 18b are suitably secured to terminal posts 16a and 16b and, in the exemplary arrangement, lead bushings 17a and 17b are provided for sealing the cover 11 where the terminal posts pass therethrough.

For the purpose of allowing for the addition of distilled water to the battery cells when necessary, a plurality of circular apertures or filler ports 19a–19f are provided in the cover 11, one filler port being provided for each battery cell. Since the battery 10 is illustrated as having six cells, six filler ports have been provided in the cover. The filler ports 19a–19f are threaded and are thereby adapted to receive threaded filler caps 20. In order to provide a flush battery top, recesses 22a–22f may be provided in the cover 11 coaxially with the filler ports 19a–19f which are adapted to receive the filler caps 20.

As may be seen by reference to FIG. 3, the cells of the battery are separated and defined by parallel walls 24, the upper edge portions of which are in engagement with channels 25 defined by ribs 26 formed in the lower surface of the cover 11. Side walls and a bottom wall (not shown) define the remaining sides and bottoms of the cells, the upper edge portions of the side walls engaging channels in the cover 11. Preferably, the upper edge portions of the walls 24 and the free edges of the side walls of the battery casing 12 are cemented in place within the channels of the cover 11 during assembly of the battery casing to prevent any leakage of electrolyte between adjacent cells or to the exterior of the battery. Each cell contains an electrode assembly having a pair of terminal posts (not shown). Adjacent terminal posts of adjacent cells are suitably connected together by, for example, an up-and-over intercell connecting arrangement (not shown). Within the endmost cells, the terminal posts 16a and 16b are respectively connected to the terminal leads 18a and 18b.

In accordance with a principal aspect of the present invention, the cover 11 is provided with new and improved means for venting the cells of the battery 10. More specifically, the cover 11 is provided with a venting system which includes a plurality of venting cavities 30a–30f, one cavity communicating with each of the battery cells. For the purpose of venting the cells into the cavities 30a–30f, apertures or venting ports 31a–31f are provided in the cover 11, below the cavities, which communicate with the associated cells. The open tops of the cavities 30a–30f are closed by a cover sheet 13 to define venting chambers for these cells.

In keeping with the present invention, the cover sheet is formed to pass gases and prevent the passage of liquid therethrough. Accordingly, the cover sheet 13 may be in the form of a strip of hydrophobic microporous plastic which is suitably secured to the cover, for example, with a pressure-sensitive adhesive. The sheet 13 and the pressure-sensitive adhesive should be acid resistant so that the cover sheet adheres to the outer surface of the battery cover surrounding the various cavities 30a–30f. The microporous plastic may be made from a gas permeable sheet produced from high density polyethylene powder by sintering. The permeability of such plastic may be on the order of 100–500 cubic feet per minute per square foot at 8 inches water-gauge pressure. The original powder particle size for such material may be on the order of 50 microns. The microporous plastic is designed to pass gases therethrough and to prevent the passage of liquid therethrough. Additionally, the sheet 13 has a smooth exterior surface and a rough interior surface, and is non-wettable by nature so that the material does not absorb any of the electrolyte. Consequently, the sheet 13 functions to independently vent each of the battery cells while preventing the egress of electrolyte spray therethrough and prevents the contamination of the area within which the battery is located. In other words, the sheet 13 functions to separate entrapped liquid from gases generated within the battery cells, allowing the gases to pass through the sheet and to be dissipated into the surrounding atmosphere. The condensed liquids are returned to the cells through the ports 31a–31f.

In view of the foregoing, it will be apparent that the sheet 13 functions to minimize the loss of electrolyte from the battery cells and prevents the carry-over of electrolyte between the cells. Additionally, in the event the concentration of gases in the atmosphere adjacent the battery should be ignited, the microporous plastic sheet 13 prevents the ignition of those gases remaining within the cells and thereby prevents the battery from exploding. Thus, the disclosed battery is explosion-proof.

In further keeping with the present invention, the battery cover may be designed to prevent acid creep between the sheet 13 and the cover. For this purpose, the cover sheet 13 is disposed within a recess 36, provided in the cover 11, which surrounds the cavities 30a–30f. Moreover, the top portion of the cover 11 adjacent the recess 36 may be built up (see 11a in FIG. 4), or the cover may be recessed an amount greater than the thickness of the cover sheet 13, and a sealant bead of resin 37 may be provided around the periphery of the recess as shown in FIG. 4 for sealing the cover sheet to the cover.

This will aid in preventing acid creep between the cover and the microporous plastic sheet and thus will aid in preventing the escape of electrolyte to the atmosphere. It will be apparent that a sealant may also be disposed between the cover and the cover sheet in the area between adjacent ones of the cavities 30a–30f to prevent acid creep between adjacent cells.

Since the cover 11 is recessed to receive the cover sheet 13 and since the exemplary cover is also recessed to receive the filler caps 20 and the terminal leads 18a and 18b, it will be readily apparent that the assembled battery 10 has a substantially flush top and has a more aesthetic appearance than present, conventional batteries.

An alternative sealing arrangement for the cover sheet 13 is shown in FIG. 5. In this arrangement, the cover sheet 13 is disposed in a slot 40 provided in the cover 11 and the cover sheet is suitably cemented to the cover, such as by a sealant 41. In order to allow for the insertion of the cover sheet in the slot, the slot may extend to one end of the cover and that end may be sealed subsequent to the insertion of the cover sheet therein. On the other hand, the cover sheet may be molded in place within the cover or the cover sheet may be inserted in the slot in any other suitable manner. It will be apparent that this arrangement likewise aids in preventing acid creep. Additionally, it will be readily apparent that various other sealing arrangements may be employed.

What is claimed is:

1. In combination, a storage battery with a plurality of battery cells, a battery cover with an inner surface associated with the interior of the battery and an outer surface, a plurality of passageways in the battery cover between said outer surface and interior portions of the battery corresponding to different battery cells, a plurality of venting cavities in the outer surface of the battery cover, said cavities being formed around respective ones of said passageways, a microporous sheet covering all of said cavities whereby said passageways are isolated from one another.

2. The combination of claim 1 wherein each of said venting cavities includes walls sloping toward said passageways.

3. The combination of claim 1 further including a plurality of filling ports at locations separate from said cavities.

4. The combination of claim 1 wherein said microporous member is sintered high density polyethylene powder.

References Cited

UNITED STATES PATENTS

| | | | |
|---|---|---|---|
| 2,890,262 | 6/1959 | Kendall et al. | 136—177 XR |
| 3,033,911 | 5/1962 | Duddy | 136—177 |
| 3,218,198 | 11/1965 | Havlick | 136—177 |

WINSTON A. DOUGLAS, *Primary Examiner.*

D. L. WALTON, *Assistant Examiner.*